(12) United States Patent
Gluesenkamp

(10) Patent No.: US 9,949,611 B1
(45) Date of Patent: Apr. 24, 2018

(54) CONFIGURATION OF DISHWASHER TO IMPROVE ENERGY EFFICIENCY OF WATER HEATING

(71) Applicant: UT-Battelle, LLC, Oak Ridge, TN (US)

(72) Inventor: Kyle R. Gluesenkamp, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 15/420,431

(22) Filed: Jan. 31, 2017

(51) Int. Cl.
*A47L 15/42* (2006.01)
*F25B 21/02* (2006.01)
*A47L 15/00* (2006.01)
*F25B 30/00* (2006.01)
*F25B 41/04* (2006.01)

(52) U.S. Cl.
CPC ....... *A47L 15/4291* (2013.01); *A47L 15/0047* (2013.01); *A47L 15/4221* (2013.01); *A47L 15/4223* (2013.01); *A47L 15/4225* (2013.01); *A47L 15/4285* (2013.01); *F25B 21/02* (2013.01); *F25B 30/00* (2013.01); *F25B 41/046* (2013.01); *F25B 2321/0212* (2013.01); *F25B 2321/0252* (2013.01)

(58) Field of Classification Search
CPC ............. A47L 15/4291; A47L 15/0047; A47L 15/4221; A47L 15/4223; A47L 15/4225; A47L 15/4285; F25B 30/00; F25B 41/046; F25B 2321/0212; F25B 2321/0252; F25B 21/02
USPC .............................................. 134/105; 62/3.2
See application file for complete search history.

(56) References Cited

U.S. PATENT DOCUMENTS 7,604,014 B2   10/2009   Paintner
8,176,926 B2    5/2012   Gaus et al.

*Primary Examiner* — Michael E Barr
*Assistant Examiner* — Tinsae B Ayalew
(74) *Attorney, Agent, or Firm* — Colin L. Cini

(57) ABSTRACT

A washing machine includes a sealed tub for accepting articles to be washed. A liquid circulation circuit sprays a pressurized liquid (e.g. water, detergent, solvent) around the articles to clean them. The liquid circulation circuit is in thermal contact with a hot side of a thermoelectric device. A heat sink is in thermal contact with both a cold side of the thermoelectric device and a heat sink charging circuit. A liquid is successively directed one or more times through the liquid circulation circuit with the thermoelectric device powered on, and then directed one or more times through the heat sink charging circuit with the thermoelectric device powered off. Finally, the liquid is discharged from the tub after having its temperature lowered by heat exchange to the heat sink.

14 Claims, 2 Drawing Sheets

US 9,949,611 B1

CONFIGURATION OF DISHWASHER TO IMPROVE ENERGY EFFICIENCY OF WATER HEATING

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

CROSS-REFERENCE TO RELATED APPLICATIONS

None.

THE NAMES OF THE PARTIES TO A JOINT RESEARCH AGREEMENT

None.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

None.

STATEMENT REGARDING PRIOR DISCLOSURES BY THE INVENTOR OR A JOINT INVENTOR

None.

BACKGROUND OF THE INVENTION

1. Field of the Invention

The present disclosure relates to machines for washing dirty articles such as dishes and more particularly to a dishwasher having heat recovery for improved energy efficiency.

2. Description of the Related Art

A dishwasher is a cabinet-like appliance that, with the aid of water and detergent, washes, rinses, and dries dishware, glassware, eating utensils, and most cooking utensils. Dishwashers are ubiquitous in most modern day households and are often used more than once per week. Parts washers also use water, detergents or solvents to wash parts in certain manufacturing operations to remove contaminants prior to performing subsequent operations such as painting, coating or packaging.

According to the US Department of Energy's Scout calculator, all combined US residential dishwashers consumed 286 TBtu/yr primary energy in the year 2016 and this consumption is projected to increase to 321 TBtu/yr in the year 2030. Most of this energy is used for heating water during the wash cycle and drying the dishes when a drying cycle option is selected.

What is needed is a washing machine that maintains satisfactory cleaning and drying performance while also reducing energy consumption.

BRIEF SUMMARY OF THE INVENTION

Disclosed are several examples of washing machines and methods for cleaning dishes or other articles of manufacture with reduced energy consumption.

The following summary is provided to facilitate an understanding of some of the innovative features unique to the embodiments and is not intended to be a full description. A full appreciation of the various aspects of the embodiments disclosed can be gained by taking the entire specification, claims, drawings, and abstract as a whole.

A washing machine includes a sealed tub for accepting articles to be washed. A liquid circulation circuit sprays a pressurized liquid (e.g. water, detergent, solvent) around the articles to clean them. The liquid circulation circuit is in thermal contact with a hot side of a thermoelectric device. A heat sink is in thermal contact with both a cold side of the thermoelectric device and a heat sink charging circuit. A liquid is successively directed one or more times through the liquid circulation circuit with the thermoelectric device powered on, and then directed one or more times through the heat sink charging circuit with the thermoelectric device powered off. Finally, the liquid is discharged from the tub at a temperature that is lower than the temperature at which the liquid entered the heat sink charging circuit for the first time.

A method of operating an energy efficient washing machine includes the steps of: a) filling a sealed tub with a volume of unheated liquid (e.g. water, detergent, solvent); b) pressurizing the liquid with a recirculation pump and directing the liquid through a liquid circulation circuit disposed inside of the tub by positioning a switching valve in a first position while heating the liquid circulation circuit with a thermoelectric device that is powered on and that has a hot side in thermal contact with the liquid circulation circuit and that has a cold side in thermal contact with a heat sink; c) directing the liquid through a heat sink charging circuit in thermal contact with the heat sink by positioning the switching valve in a second position while removing the power from the thermoelectric device; and d) discharging the liquid from the washing machine at a temperature that is lower than the temperature of the liquid entering the heat sink charging circuit.

BRIEF DESCRIPTION OF THE SEVERAL VIEWS OF THE DRAWING(S)

The machine and method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION OF THE INVENTION

Figure 1:
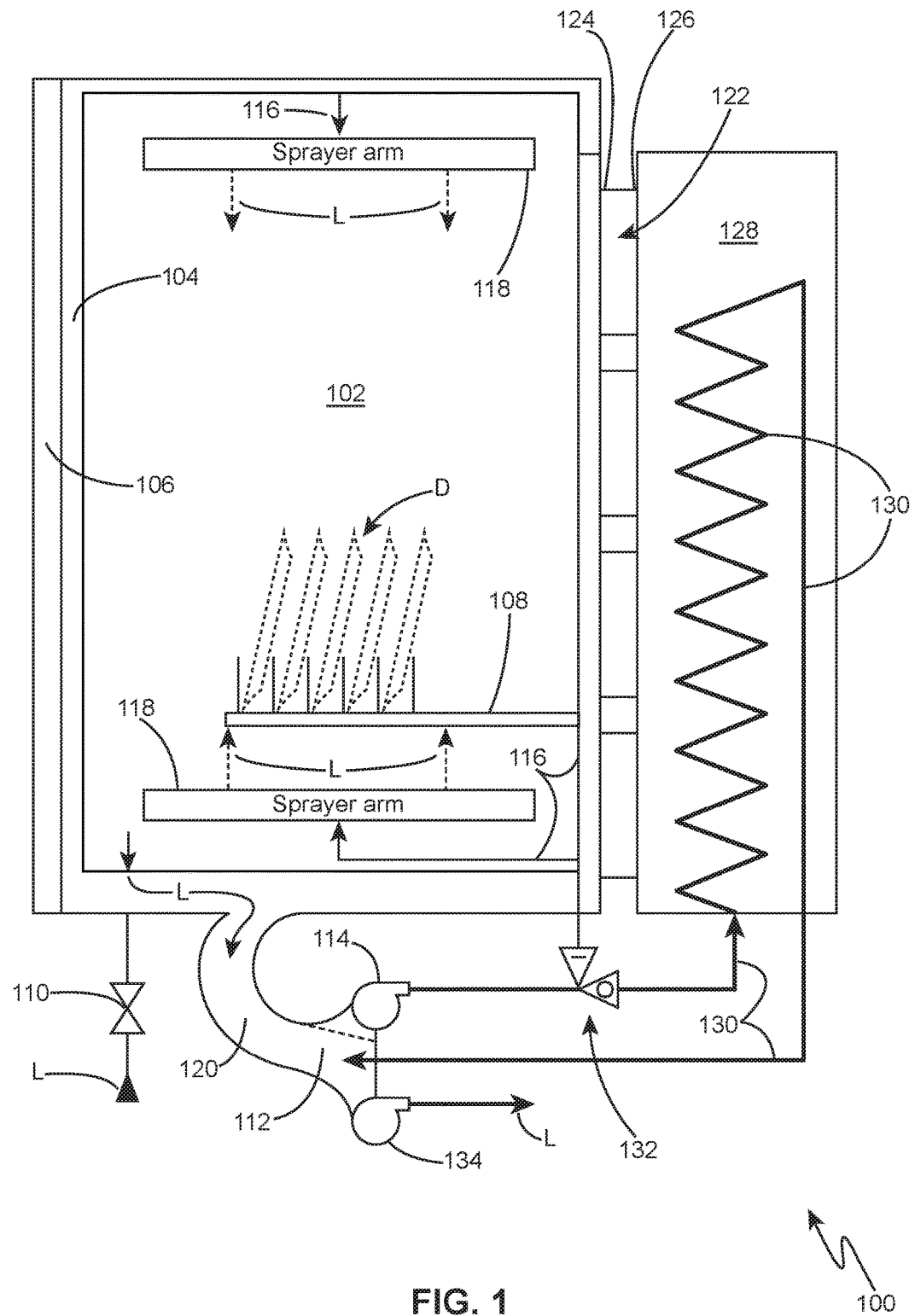
FIG. 1 is a sectional view of a machine for washing articles such as dishes and parts.
Figure 2:
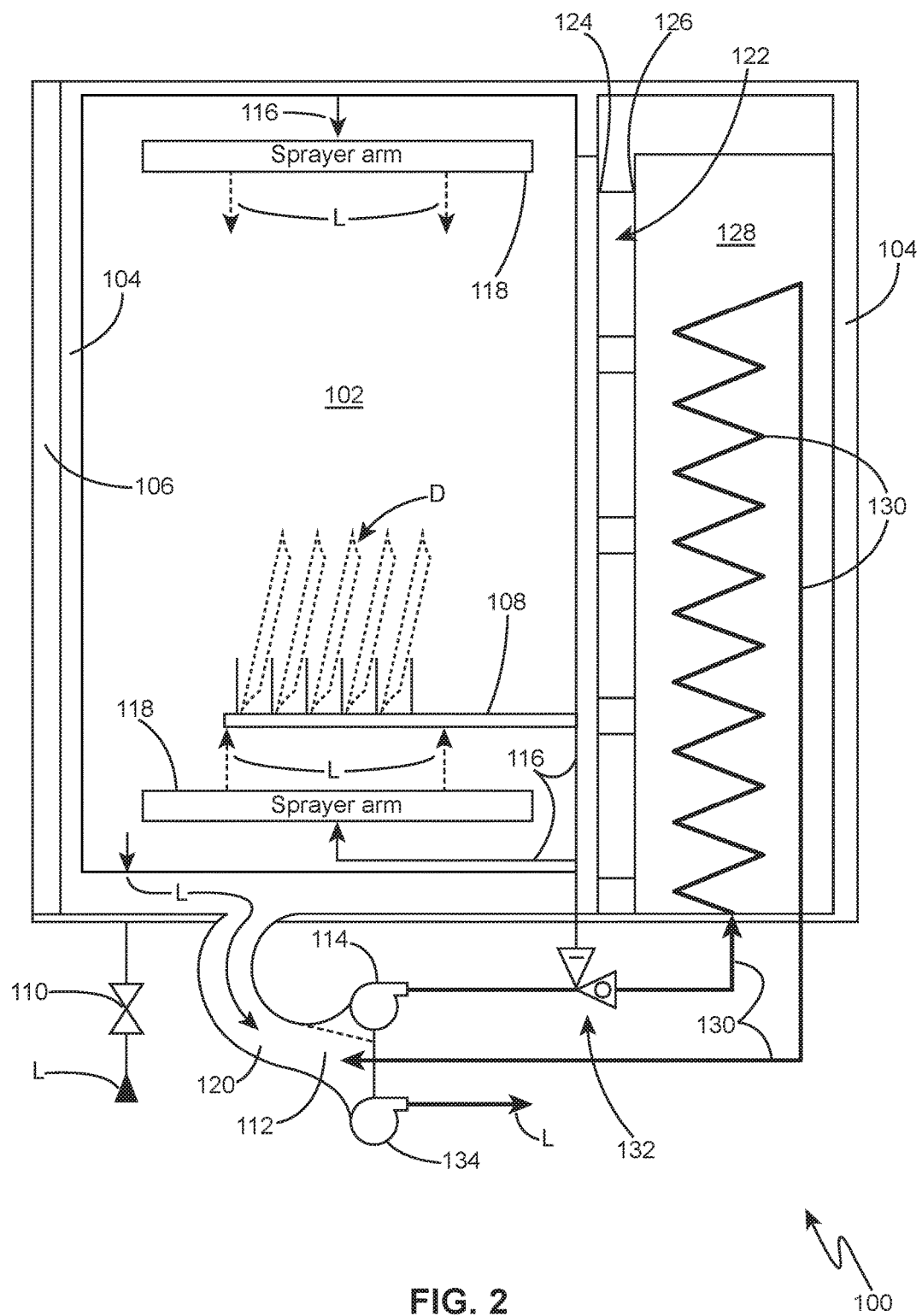
FIG. 2 is a sectional view of another machine for washing articles such as dishes and parts.

With reference to FIGS. 1 and 2, a dishes or parts washing machine 100 includes a sealed tub 102 defined by an outer wall 104 and a hinged door 106 with each component made of stainless steel, coated steel, composite, plastic or other corrosion-resistant materials. Soiled dishes (D), parts, or other articles are loaded in racks 108 located inside the tub 102. A volume of a working liquid (L) (e.g. water, detergent, water/detergent mix, solvent) is directed to the tub 102 at room temperature and at line pressure through an inlet valve 110. This is referred to as the fill cycle of the washing machine and it generally takes 60 seconds to complete for example.

The liquid (L) is first directed through a filter 112 before being pressurized by a recirculation pump 114 and directed through a liquid circulation circuit 116. The liquid (L) is then discharged under pressure from spray arms 118, to the articles (D) to be washed. Some examples may contain more or less spray bars 118 in the same or different locations and positions. The circulated liquid (L) then flows by gravity to the bottom of the tub 102 and enters a sump 120, where it enters a suction side of the recirculation pump 114 again. The liquid (L) is continuously pumped, circulated about the articles (D), filtered and pumped again over a period of time. This is referred to as the wash cycle of the washing machine and generally takes 600 seconds for example.

During the above-described wash cycle, the liquid (L) in the circulation circuit 116 is heated by a thermoelectric device 122 that includes a hot side 124 and a cold side 126 and is powered on by an electric power source. A thermoelectric device 122 is a device that converts electric power into a temperature difference (e.g., hot side, cold side) and may include a single device 122, two devices 122 or an array of devices 122. Exemplary thermoelectric devices 122, such as model TEHC1-12708, available from Thermonamic Electronics(Jiangxi) Corp., Ltd., can be used in this application.

The hot side 124 of the thermoelectric device 122 is in thermal contact with the circulation circuit 116. The term "thermal contact" describes a juxtaposition of two components that allows heat energy from a first component to transfer to a second component. The transfer of heat energy may take place in either direction and by one or a combination of conduction, convection and radiation heat transfer mechanisms. A thermally conductive grease may also be applied between two components to improve the conductive heat transfer.

The cold side 126 of the thermal electric device 122 is in thermal contact with a heat sink 128. The heat sink 128 is a mass that absorbs, stores and releases heat energy over a period of time. In some examples, the heat sink 128 is a volume of steel, copper, graphite foam, phase change material or other material. In other examples, the heat sink 128 is a sealed volume of water or other liquid.

The heat sink 128 is also in thermal contact with a heat sink charging circuit 130. The charging circuit 130 forms a serpentine or other circuitous path through and/or around the heat sink 128 for the liquid (L) to be directed through. The charging circuit 130 may include internal flow disruptors such as strips, pedestals, orifices and other features known in the art to improve turbulence. The charging circuit 130 enables the transfer of heat from the liquid (L) to the heat sink 128 where it is absorbed and stored for release at a later time. This is referred to as the preheat cycle of the washing machine and generally takes 60 seconds for example.

The heat sink 128 and the charging circuit 130 may be disposed outside of the sealed tub 102 as illustrated in FIG. 1 or inside of the sealed tub 102 as illustrated in FIG. 2. Note that in the example of FIG. 2, the thermoelectric device 122 must be properly sealed from the circulating liquid (L).

According to a first step of operation, the sealed tub 102 is loaded with articles (D) to be cleaned, along with optional detergents and rinse aids, and then the door 106 is closed and secured with a latch to form a liquid-tight seal. The tub 102 is then filled with a volume of unheated working liquid (L) (e.g. water, detergent, solvent) through the inlet valve 110 such as a solenoid valve or a ball valve for example. It is important to note that no energy is expended to preheat the liquid (L) prior to entering the washing machine 100.

According to a second step of operation, the filtered liquid (L) is pressurized with the recirculation pump 114 and is directed through the liquid circulation circuit 116 by positioning a switching valve 132 in a first position. Concurrently, the liquid circulation circuit 116 is heated with the thermoelectric device 122 that is powered on. Here, the hot side 124 of the thermoelectric device 122 is in thermal contact with the liquid circulation circuit 116 and the cold side 126 is in thermal contact with the heat sink 128. This step occurs over a time period of approximately 600 seconds for example.

According to a third step of operation, the switching valve 132 is positioned in a second position while the thermoelectric device 122 is powered off. The recirculation pump 114 directs the pressurized liquid (L) only through the heat sink charging circuit 130, which is in thermal contact with the heat sink 128. This step occurs over a time period of approximately 60 seconds for example.

According to a final step of operation, the liquid (L) is discharged from the washing machine 100, with a drain pump 134, at a temperature that is lower due to a heat exchange with the heat sink charging circuit 130. Thus, a portion or all of the heat energy of the liquid (L) is transferred to the heat sink 128, which is then used to preheat the thermoelectric device 122 during the next fill and wash cycles.

The disclosed washing machine 100 and method maintain adequate cleaning and drying performance while also reducing energy consumption. By implementing thermoelectric heat pumping in dishwashers for water heating and drying, 35% savings (0.5 kWh/cycle) is expected. By saving 0.5 kWh per cycle, when compared with the today's state of the art of 1.43 kWh/cycle, represents a technical potential energy savings of 90 TBtu/yr. Fully implemented, this also represents $1.02 billion USD per year national utility bill savings (at 12 cents/kWh). According to American Council for an Energy Efficient Economy (ACEEE), every $1M saved in utility cost has the potential to support 7.4 jobs by transferring consumer spending from the low-labor energy industry to the broader economy, hence the proposed technology has the potential to indirectly support 1,020 jobs.

While this disclosure describes and enables several examples of an energy-efficient dishwasher, other examples and applications are contemplated. For example, the examples may be used with residential, commercial and industrial washing machines. Accordingly, the invention is intended to embrace those alternatives, modifications, equivalents, and variations as fall within the broad scope of the appended claims. The technology disclosed and claimed herein may be available for licensing in specific fields of use by the assignee of record.

What is claimed is:

1. A washing machine comprising:
   a sealed tub for accepting items to be washed by a cleaning liquid;
   a liquid circulation circuit disposed inside of said tub for spraying the liquid, which is pressurized by a recirculation pump, to the items to be washed;
   a heat sink for receiving and providing heat energy;
   a heat sink charging circuit in thermal contact with said heat sink and alternately connected to said liquid circulation circuit through a switching valve;
   a thermoelectric device having a hot side and an opposing cold side and where the hot side is in thermal contact with said liquid circulation circuit and the cold side is in thermal contact with said heat sink; and wherein liquid is directed through said liquid circulation circuit when the switching valve is positioned in a first configuration and liquid is directed through said heat sink charging circuit when the switching valve is positioned in a second configuration.

2. The washing machine of claim 1 wherein said thermoelectric device and said heat sink are disposed outside of said sealed tub.

3. The washing machine of claim 1 wherein said heat sink is a metallic block.

4. The washing machine of claim 1 wherein said heat sink is a sealed vessel of liquid.

5. The washing machine of claim 1 and further comprising a drain pump for discharging the liquid after the liquid flows through said heat sink charging circuit.

6. The washing machine of claim 1 wherein the temperature of the discharged liquid is lowered after exchanging heat to the heat sink.

7. The washing machine of claim 1 wherein said thermoelectric device is powered on when liquid flows through said liquid circulation circuit and said thermoelectric device is powered off when liquid flows through said heat sink charging circuit.

8. The washing machine of claim 1 wherein said thermoelectric device is an array of several thermoelectric devices.

9. A washing machine comprising:
   a sealed tub for accepting articles to be washed;
   a liquid circulation circuit for spraying a liquid at the articles, said liquid circulation circuit being in thermal contact with a hot side of a thermoelectric device;
   a heat sink being in thermal contact with a cold side of the thermoelectric device and also being in thermal contact with a heat sink charging circuit; and
   wherein the liquid is successively directed for a period of time through said liquid circulation circuit with said thermoelectric device powered on and then directed for a period of time through said heat sink charging circuit with said thermoelectric device powered off before being discharged from said tub.

10. A method of operating a washing machine comprising the steps of:
   a. filling a sealed tub with a volume of an unheated liquid;
   b. directing the liquid with a recirculation pump through a liquid circulation circuit disposed inside of said tub by positioning a switching valve in a first position while heating the liquid circulation circuit with a thermoelectric device that is powered on and that has a hot side in thermal contact with the liquid circulation circuit and a cold side in thermal contact with a heat sink;
   c. directing the liquid through a heat sink charging circuit in thermal communication with said heat sink by positioning the switching valve in a second position while removing the power from the thermoelectric device; and
   d. discharging the liquid from the washing machine at a temperature that is lowered due to heat exchange with the heat sink.

11. The method of claim 10 wherein the thermoelectric device and said heat sink of step b) are disposed outside of said sealed tub.

12. The method of claim 11 wherein the heat sink of step b) is a metallic block.

13. The method of claim 11 wherein said heat sink of step b) is a sealed vessel of liquid.

14. The method of claim 11 wherein said thermoelectric device is an array of several thermoelectric devices.

* * * * *